United States Patent
Le Tourneur et al.

(10) Patent No.: US 7,043,013 B2
(45) Date of Patent: May 9, 2006

(54) METHOD FOR ADAPTIVE CONTROL OF MULTICHANNEL ACOUSTIC ECHO CANCELLATION SYSTEM AND DEVICE THEREFOR

(75) Inventors: Gregoire Le Tourneur, St. Quay-Perros (FR); Delphine Feurte, Chelles (FR)

(73) Assignee: France Telecom, Paris (FR)

( * ) Notice: Subject to any disclaimer, the term of this patent is extended or adjusted under 35 U.S.C. 154(b) by 74 days.

(21) Appl. No.: 10/476,180

(22) PCT Filed: May 14, 2002

(86) PCT No.: PCT/FR02/01616

§ 371 (c)(1),
(2), (4) Date: Nov. 5, 2003

(87) PCT Pub. No.: WO02/093895

PCT Pub. Date: Nov. 21, 2002

(65) Prior Publication Data

US 2004/0131197 A1    Jul. 8, 2004

(30) Foreign Application Priority Data

May 16, 2001   (FR)   .................. 01 06449

(51) Int. Cl.
   *H04M 9/08*   (2006.01)
(52) U.S. Cl. .................. 379/406.04; 379/406.08; 379/390.02
(58) Field of Classification Search ............. 379/390, 379/406, 390.02, 406.04, 406.06, 406.08, 379/406.09
See application file for complete search history.

(56) References Cited

U.S. PATENT DOCUMENTS

| | | | |
|---|---|---|---|
| 5,323,459 A | | 6/1994 | Hirano |
| 5,598,468 A | * | 1/1997 | Ammicht et al. ...... 379/406.08 |
| 5,664,019 A | * | 9/1997 | Wang et al. ........... 379/390.02 |
| 5,828,756 A | | 10/1998 | Benesty et al. |

FOREIGN PATENT DOCUMENTS

| | | |
|---|---|---|
| EP | 0 766 446 | 4/1997 |
| EP | 0 944 228 | 9/1999 |

OTHER PUBLICATIONS

F. Amand et al.: "Multi-channel acoustic echo cancellation" International Workshop on Acoustic Echo and Noise Control, pp. 57-60 1995.

* cited by examiner

*Primary Examiner*—Daniel Swerdlow
(74) *Attorney, Agent, or Firm*—Oblon, Spivak, McClelland, Maier & Neustadt, P.C.

(57) ABSTRACT

A method for adaptive control of a multi-channel echo cancellation system including N loudspeakers, where N is an integer greater than or equal to 2, and M microphones, where M is an integer greater than or equal to 1. The system includes N×M identification filters with variable coefficients, the identification filters being used to estimate acoustic coupling between the loudspeakers and the microphones as a function of a variable coefficients adaptive step. The variable coefficients adaptive step depends on whether or not there is a signal present on the loudspeakers. The method is applicable to hands-off operation of communication tools.

8 Claims, 3 Drawing Sheets

US 7,043,013 B2

METHOD FOR ADAPTIVE CONTROL OF MULTICHANNEL ACOUSTIC ECHO CANCELLATION SYSTEM AND DEVICE THEREFOR

TECHNICAL DOMAIN AND PRIOR ART

This invention relates to a method for adaptive control of a multi-channel echo cancellation system and a device for implementing the method.

The invention is applicable to hands-off operation of communication tools, for example such as mobile telephones, personal computers (PCs) and more generally any type of device present in audio and/or video workstations in which audio communication is made using several loudspeakers at a distance from the participants.

Acoustic echo is a major obstacle to smooth hands-off operation of communication tools. Acoustic echo is the result of a signal which is emitted by a loudspeaker, and is picked up by a microphone either directly or by reflection. Many studies have been carried out on the problem of acoustic echo, both for single-dimensional and for multi-dimensional cases.

In the single-dimensional case, there is only one sound pick-up signal and only one sound reproduction signal, even if the sound pick-up signal is picked up by several microphones and the sound reproduction signal is reproduced on several loudspeakers.

In the multi-dimensional case, an echo cancellation system comprises N signal reception channels, each comprising a loudspeaker $Hp_i$ (i=1, 2, . . . , N) and M sound pick-up channels, each sound pick-up channel comprising a microphone $MC_j$ (j=1, 2, . . . , M). This type of echo cancellation system is shown in FIG. 1. It comprises N×M acoustic channels and consequently N×M echo cancellation devices H (i, j). Each echo cancellation device H(i, j) comprises an identification filter that estimates acoustic coupling between the loudspeaker $HP_i$ and the microphone $MC_j$. Apart from the problem of real time operation of such a system, due to the required calculation power, another problem arises related to convergence of the identification filter control algorithm.

Many studies have been carried out on the problem of convergence of the identification filter control algorithm. For example, convergence methods include the method based on the addition of random noise or the method based on introduction of a non-linear function to decorrelate signals to be processed. This method is described in U.S. Pat. No. 5,828,756 by Benesty et al. issued in the United States on Oct. 27, 1998 entitled "Stereophonic acoustic echo cancellation using non-linear transformations".

Convergence methods according to prior art have many disadvantages, including the long calculation times.

The invention does not have the disadvantages mentioned above.

PRESENTATION OF THE INVENTION

The invention relates to a method for adaptive control of a multi-channel echo cancellation system comprising N loudspeakers $HP_i$ (i=1, 2, . . . , N), where N is an integer greater than or equal to 2, and M microphones $MC_j$ (j=1, 2, . . . , M), where M is an integer greater than or equal to 1, the system comprising N×M identification filters $F_{ij}$ with variable coefficients, the identification filter $F_{ij}$ being used to check acoustic coupling between the loudspeaker $HP_i$ and the microphone $MC_j$ under the action of control information, the control information being calculated using an adaptive algorithm based on an error signal between a signal detected by the microphone $MC_j$ and a reference signal that includes the estimated signal output from the identification filter $F_{ij}$, and a variable coefficients adaptive step. The reference signal also comprises a signal equal to the sum of P estimated supplementary signals $\hat{y}_{k,j k \neq i}$ (k=1, 2, . . . , i−1, i+1, . . . , P+1) output from P identification filters $F_{kjk \neq i}$, where P is an integer between 1 and N−1, and the variable coefficients adaptive step depends on whether or not there is a signal present on the P loudspeakers $HP_k$ (k≠i).

The invention also relates to a device for adaptive control of a multi-channel echo cancellation system comprising N loudspeakers $HP_i$ (i=1, 2, . . . , N), where N is an integer greater than or equal to 2, and M microphones $MC_j$, where M is an integer greater than or equal to 1, the system comprising an identification filter $F_{ij}$ with variable coefficients to estimate acoustic coupling between the loudspeaker $HP_i$ and the microphone $MC_j$, the identification filter being controlled by control information output from an update unit controlled by an error signal between a signal detected by the microphone and a reference signal that includes the estimated signal output from the identification filter $F_{ij}$, and by a variable coefficients adaptive step. The device comprises means of adding the estimated signals $\hat{y}_{k,j\ k \neq i}$(k=1, 2, . . . , i−1, i+1, . . . , P+1) output from P identification filters $F_{kj\ k \neq i}$, to the reference signal, where P is an integer between 1 and N−1 and means of modifying the value of the variable coefficients adaptive step depending on whether or not there is a signal present on the P loudspeakers $HP_k$ (k≠i).

As will become clear later, in one preferred embodiment of the invention the number P is equal to N−1.

BRIEF DESCRIPTION OF THE FIGURES

Other characteristics and advantages of the invention will become clear after reading the preferred embodiment with reference to the attached figures in which.

DETAILED DESCRIPTION OF EMBODIMENTS OF THE INVENTION

Figure 1:
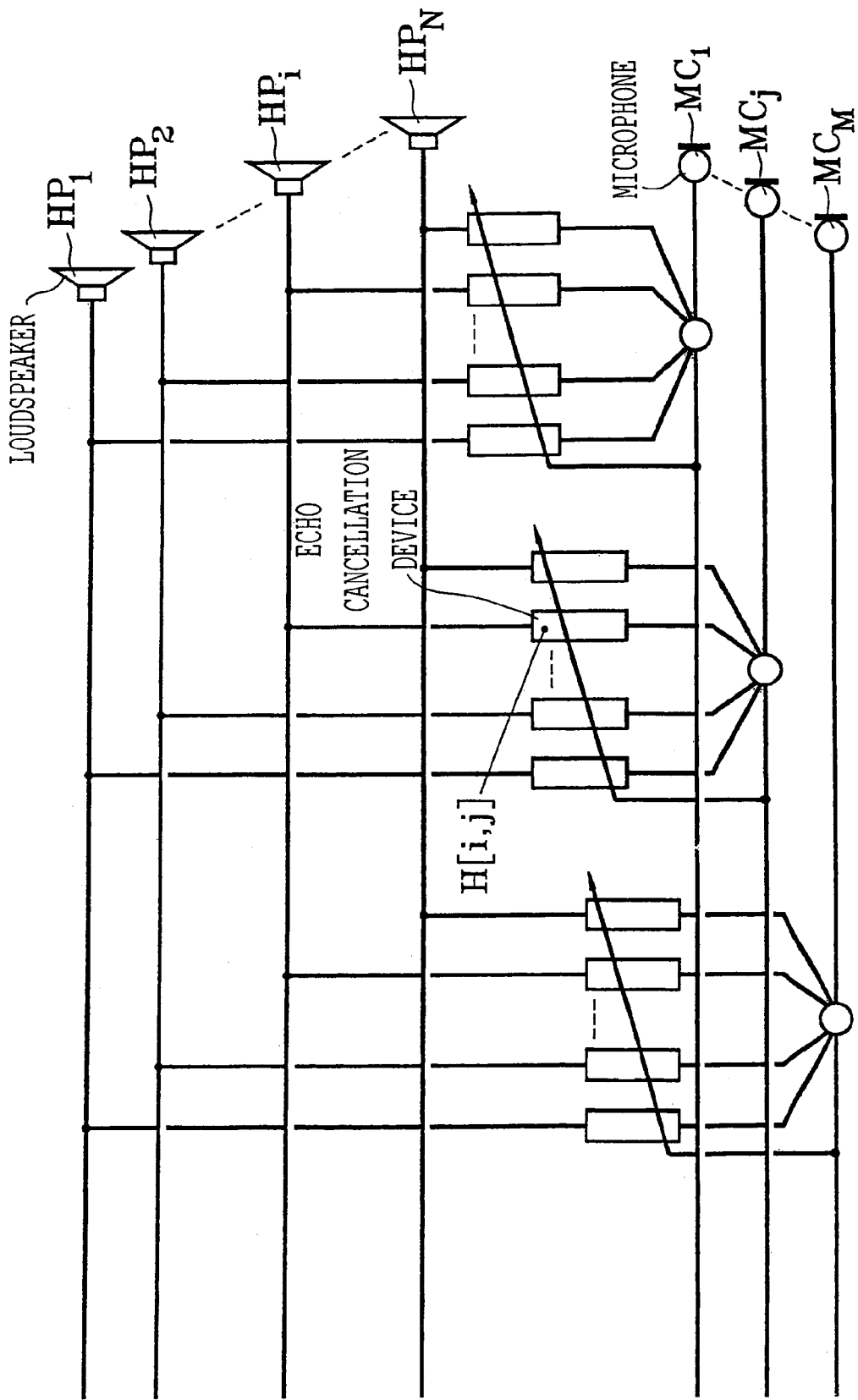
FIG. 1 shows a principle diagram of a multi-channel echo cancellation system.

FIG. 1 has already been described, therefore there is no point in describing it again.

Figure 2:
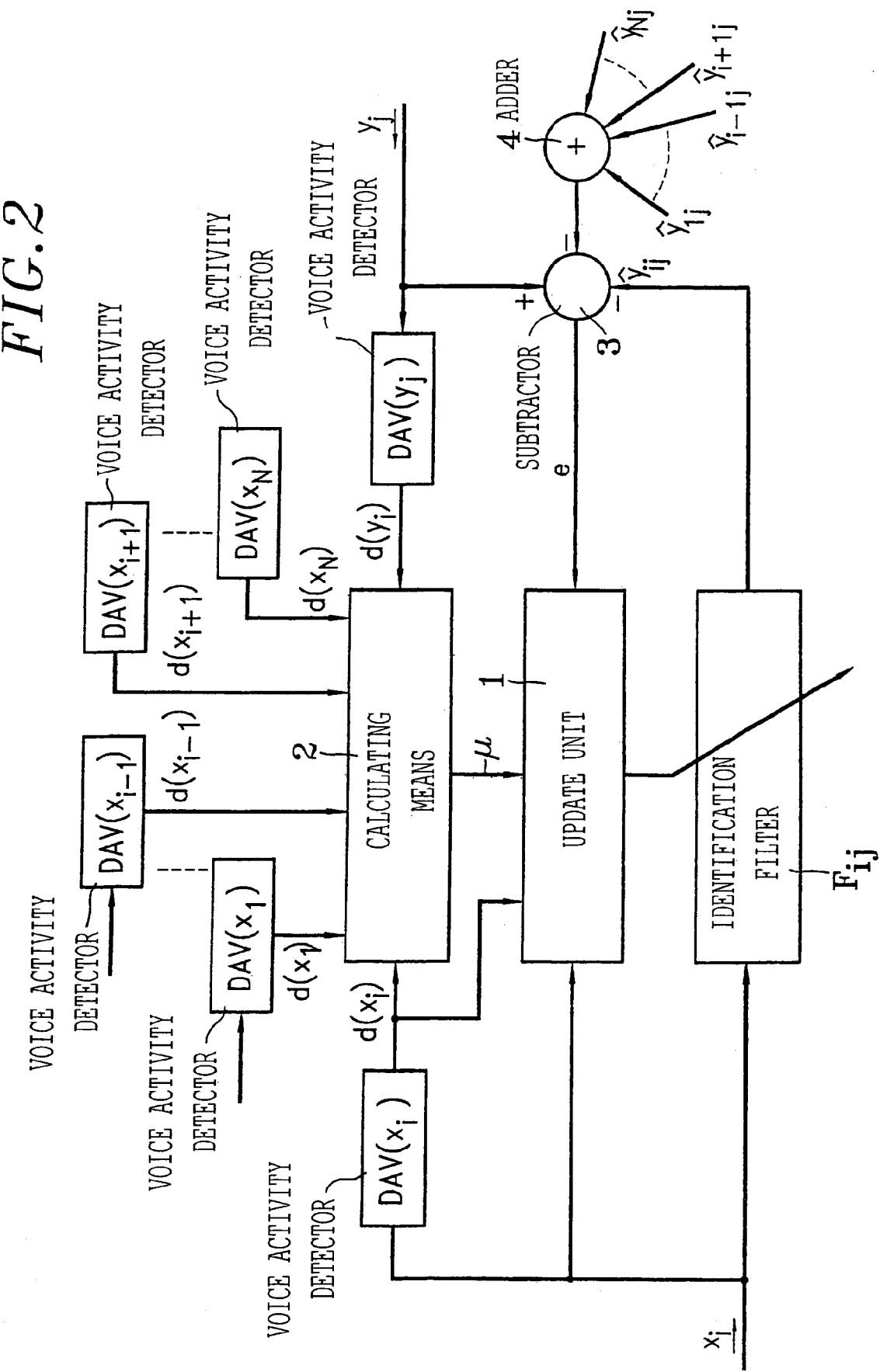
FIG. 2 shows an adaptive control device for a multi-channel echo cancellation system according to a first embodiment of the invention.

FIG. 2 shows an adaptive control device of the multi-channel echo cancellation system according to a first embodiment of the invention.

The control device in FIG. 2 is the control device according to the invention that enables echo cancellation between the microphone $MC_j$ and the loudspeaker $HP_i$.

The control device comprises an identification filter $F_{ij}$ with variable coefficients, an update unit 1, a means 2 of calculating the variable coefficients adaptive step μ, N voice activity detectors $DAV(x_i)$ (i=1, 2, . . . N), a voice activity detector $DAV(y_j)$, a subtractor 3 and an adder 4. Each voice activity detector indicates whether or not a voice signal is present, as a function of a decision threshold. Thus, the signal $d(x_i)$ output from the voice activity detector $DAV(x_j)$ indicates whether or not there is a signal present in the loudspeaker $HP_i$. Similarly, the signal $d(y_j)$ output from the detector $DAV(y_j)$ indicates whether or not there is a signal present in the microphone $MC_j$.

The identification filter $F_{ij}$ is a programmable filter with a finite pulse response for which the coefficients must be adapted. The update unit 1 adapts the filter coefficients based on the signal $x_i$ present in the loudspeaker $HP_i$, the calculated step µ of the variable coefficients and an error signal e. For example, the update unit 1 uses the Normalized Least Mean Squares (NLMS) algorithm or the order 2 Affine Projection Algorithm (APA2).

The update unit 1 updates the filter $F_{ij}$ when the following conditions are satisfied:

the detector $DAV(x_i)$ detects a voice activity, the detector $DAV(y_j)$ does not detect any voice activity, the detectors $DAV(x_{k,\,k\neq i})$ do not detect any voice activity.

According to the first embodiment of the invention, the value of the step µ is equal to zero if any one of the signals $d(x_k)$, $k\neq i$, indicates that there is a signal present on a loudspeaker $HP_k$. If no signal is detected, the adaptive step µ is chosen to be the optimum considered for the adaptive algorithm used by the update unit. For example, the coefficient µ is then equal to 0.33 for the NLMS algorithm or the APA2 algorithm.

The error signal e is equal to the difference between the signal $y_j$ present in the microphone $MC_j$ and a reference signal. The reference signal is composed of the estimated signal $\hat{y}_{i,j}$ output from the identification filter $F_{ij}$ and all estimated signals $\hat{y}_{k,j\,k\neq i}$ output from the N−1 identification filters $F_{k,j}$. Consequently, the signals $\hat{y}_{k,j\,k\neq i}$ output from the N−1 identification filters $F_{k,j}$ are summated by the adder 4.

The error signal is written as follows:

$$e = y_j - \left(\hat{y}i, j + \sum_k \hat{y}_{k,jk\neq i}\right)$$

The device according to the invention advantageously reduces the calculation time for the update step since fixing the step µ to the value zero in the presence of a signal on any of the loudspeakers stops the convergence calculation.

Figure 3:
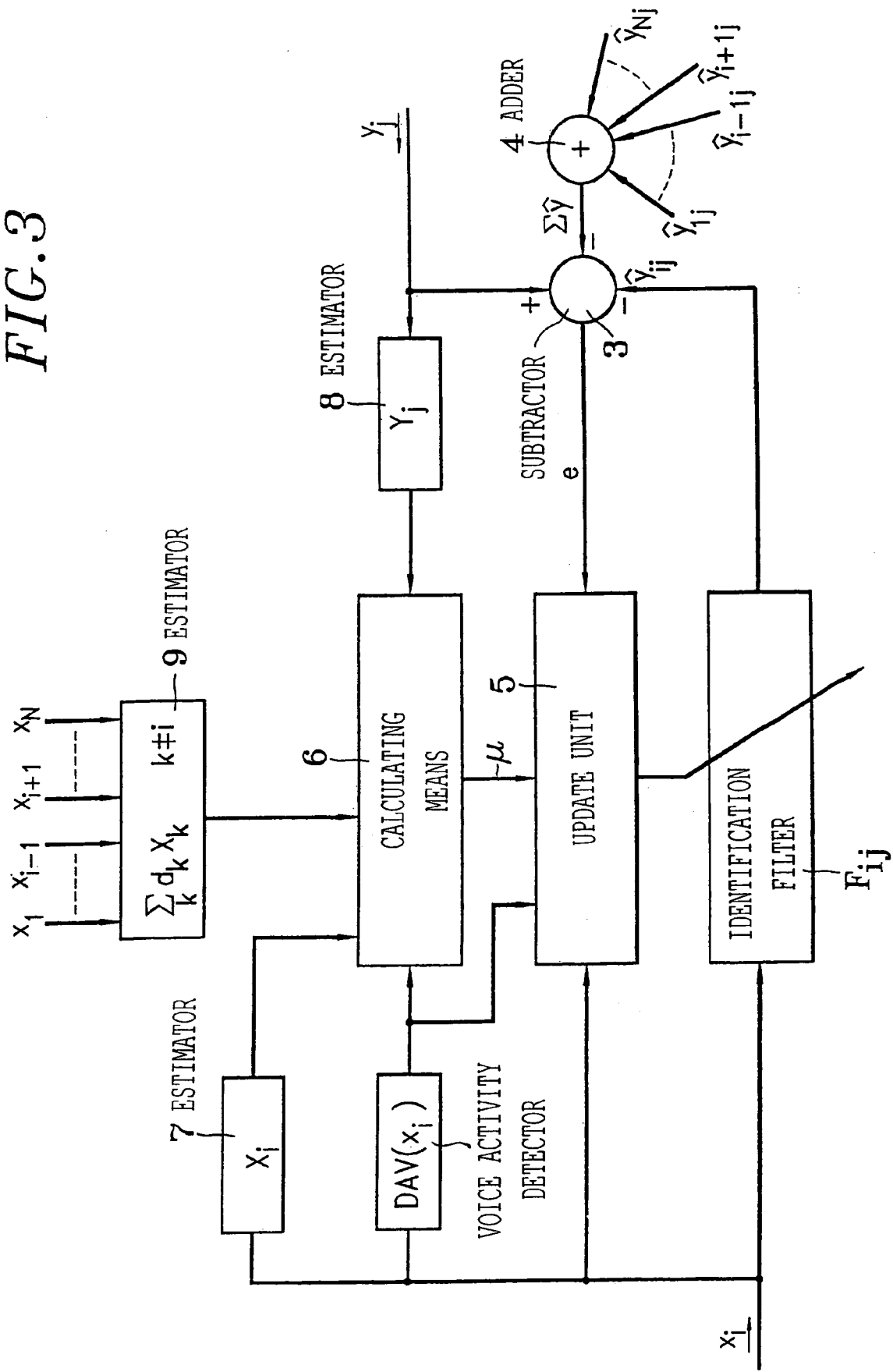
FIG. 3 shows an adaptive control device for a multi-channel echo cancellation system according to a second embodiment of the invention.

FIG. 3 shows an adaptive control device for the multi-channel echo cancellation system according to a second embodiment of the invention.

According to the second embodiment of the invention, the coefficients adaptive step µ is calculated based on the principle described in the French patent application entitled "Procédé et dispositif d'identificatipn adaptative et annuleur d'écho adaptatif incluant un tel dispositif" ("Adaptive identification method and device and adaptive echo canceller comprising such a device"), deposited in France on Sep. 13, 1995 and published as No. 2 738 695. The control device comprises an identification filter $F_{ij}$ with variable coefficients, an update unit 5, a means 6 of calculating the variable coefficients adaptive step µ, a voice activity detector DAV $(x_i)$ on the loudspeaker $HP_i$, an estimator 7 of the energy $X_i$ of the signal $x_i$, an estimator 8 of the energy $Y_j$ of the signal $y_j$, an estimator 9 of the weighted energy $$\sum_k d_k x_{k,k\neq i}$$

of signals $x_k$ ($k\neq i$) output from the N−1 loudspeakers $HP_k$ ($k=1, 2, \ldots, i-1, i+1, \ldots, N$), a subtractor 3 and an adder 4.

The update unit 5 updates the filter $F_{ij}$ when the detector DAV (xi) detects voice activity.

The variable coefficients adaptive step µ is then calculated by the following expression:

$$\mu = \frac{a_i X i}{b_i X_i + C_j Y_j + \sum_k (d_k X_{k,k\neq i})}$$

where $a_i$, $b_i$, $c_j$ and $d_k$ ($k\neq i$) are positive coefficients. As a non-limitative example, the coefficient $a_i$ may be equal to 1, the coefficient $b_i$ may be equal to 3, the coefficient $c_j$ may then be between 10 and 100 (depending on the acoustic environment conditions) and the coefficients $d_k$ may be approximately of the same order of magnitude as the coefficient $c_j$.

Advantageously, the coefficients $d_k$ can adjust the control of the step as a function of the number of loudspeaker channels. If there is a voice activity on at least one of the loudspeaker channels, the coefficient µ tends towards zero and adaptation is stopped.

One particular advantage of this second embodiment of the invention is that the coefficient µ can be made to tend continuously towards zero as the energy in the signals increases. This advantage does not exist when voice activity detectors are used since adaptation can take place with parasite signals as long as the decision threshold has not been reached. According to the second embodiment of the invention, it is particularly easy to prevent mismatching of the filter.

Regardless of its embodiment, the invention is advantageously applicable to any type of adaptive algorithm.

The invention claimed is:

1. A method for adaptive control of a multi-channel echo cancellation system including N loudspeakers, where N is an integer greater than or equal to 2, and M microphones, where M is an integer greater than or equal to 1, the system including N×M identification filters with variable coefficients, the method comprising:

estimating by the identification filters acoustic coupling between the loudspeakers and the microphones under action of control information, the control information being calculated using an adaptive algorithm based on an error signal between a signal detected by the microphones and a reference signal that includes an estimated signal output from the identification filters, and a variable coefficients adaptive step, wherein the reference signal further comprises a signal equal to a sum of P estimated supplementary signals output from P identification filters, where P is an integer between 1 and N−1, and the variable coefficients adaptive step depends on whether or not there is a signal present on the P loudspeakers, and wherein the variable coefficients adaptive step is equal to zero if there is a signal present on at least one of the loudspeakers.

2. The method according to claim 1, wherein, when the adaptive algorithm is a Normalized Least Mean Squares (NLMS) algorithm or an order 2 Affine Projection Algorithm (APA2), the variable coefficients adaptive step is equal to 0.33 if no signal is detected on the loudspeakers.

3. The method according to claim 1, further comprising:
estimating energy $X_i$ of an acoustic signal output by the loudspeakers;
estimating energy $Y_j$ of a signal received by the microphones,
estimating weighted energy $$\sum_k d_k x_{k,k \neq i}$$

of signals output from P loudspeakers, where P is an integer between 1 and N−1, and wherein the variable coefficients adaptive step is calculated by expression:

$$\mu = \frac{a_i X i}{b_i X_i + C_j Y_j + \sum_k (d_k X_{k,k \neq i})}$$

where $a_i$, $b_i$, $c_j$, and $d_k$ ($k \neq i$) are positive coefficients.

4. The method according to claim 3, wherein:
$a_i = 1$,
$b_i = 3$,
$c_j$ is between 10 and 100, and
$d_k$ is between 10 and 100.

5. Device for adaptive control of a multi-channel echo cancellation system including N loudspeakers, where N is an integer greater than or equal to 2, and M microphones, where M is an integer greater than or equal to 1, the system including at least one variable coefficients identification filter configured to estimate acoustic coupling between the loudspeakers and the microphones, the at least one variable coefficients identification filter being controlled by control information output from an update device controlled by an error signal between a signal detected by the microphones and a reference signal that includes the estimated signal output from the at least one variable coefficients identification filter, and by a variable coefficients adaptive step, the device comprising:

means for adding estimated signals output from P variable coefficients identification filters, to the reference signal, where P is an integer between 1 and N−1, and means for modifying a value of the variable coefficients adaptive step depending on whether or not there is a signal on P loudspeakers,
wherein the variable coefficients adaptive step is equal to zero if there is a signal present on at least one of the loudspeakers.

6. The device according to claim 5, wherein the means for modifying the value of the variable coefficients adaptive step comprises P voice activity detectors, the detectors indicating whether or not there is a signal on the loudspeaker.

7. The device according to claim 5, wherein the means for modifying the value of the variable coefficients adaptive step comprises first means for estimating energy $X_i$ of an acoustic signal output by the loudspeaker, second means for estimating energy $Y_j$ of a signal received by the microphone, third means for estimating weighted energy $$\sum_k d_k x_{k,k \neq i}$$

of signals output from P loudspeakers, where P is an integer between 1 and N−1, and fourth means for calculating the variable coefficients adaptive step by expression:

$$\mu = \frac{a_i X i}{b_i X_i + C_j Y_j + \sum_k (d_k X_{k,k \neq i})}$$

where $a_i$, $b_i$, $c_j$ and $d_k$ ($k \neq i$) are positive coefficients.

8. The device according to claim 7, wherein:
$a_i = 1$,
$b_i = 3$,
$c_j$ is between 10 and 100, and
$d_k$ is between 10 and 100.

* * * * *